(12) United States Patent
Park et al.

(10) Patent No.: US 7,720,181 B2
(45) Date of Patent: May 18, 2010

(54) APPARATUS AND METHOD FOR ITERATIVE DETECTION AND DECODING (IDD) IN MULTI-ANTENNA COMMUNICATION SYSTEM

(75) Inventors: Sung-Woo Park, Suwon-si (KR); Keun-Chul Hwang, Seongnam-si (KR); Soon-Young Yoon, Seoul (KR); Young-Hoon Kwon, Seongnam-si (KR); Sung-Soo Hwang, Suwon-si (KR); June Moon, Seoul (KR); Soong-Yoon Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 698 days.

(21) Appl. No.: 11/638,786

(22) Filed: Dec. 14, 2006

(65) Prior Publication Data

US 2007/0133709 A1     Jun. 14, 2007

(30) Foreign Application Priority Data

Dec. 14, 2005   (KR) .................... 10-2005-0123024

(51) Int. Cl.
*H04L 27/06* (2006.01)
(52) U.S. Cl. .................................... 375/341
(58) Field of Classification Search ............... 375/262, 375/267, 299, 316, 340, 341, 347, 349; 700/53; 455/101, 132–141; 714/786, 794, 795
See application file for complete search history.

(56) References Cited

U.S. PATENT DOCUMENTS 7,154,936 B2 * 12/2006 Bjerke et al. ................ 375/148

(Continued)

FOREIGN PATENT DOCUMENTS

KR   1020050058269   6/2005

(Continued)

OTHER PUBLICATIONS

Mathini Sellathurai et al.; "Turbo-Blast for Wireless Communications: Theory and Experiments"; IEEE Transactions on Signal Processing; vol. 50; No. 10; Oct. 2002; pp. 2538-2546.

(Continued)

*Primary Examiner*—Sam K Ahn
(74) *Attorney, Agent, or Firm*—The Farrell Law Firm, LLP

(57) ABSTRACT

An Iterative Detection and Decoding (IDD) receiving apparatus and method in a multiple input multiple output (MIMO) communication system. The IDD receiving apparatus includes an MIMO detector which generates soft decision values of coded bits by MIMO-decoding a receive vector, feedback priori information, and a list of candidate coded symbol vectors; a decoder which Soft-Input/Soft-Output (SISO)-decodes the soft decision values generated at the MIMO detector and feeds back soft decision values of the coded bits to the MIMO detector; a hard decision part which generates a coded symbol vector by performing a hard decision on the soft decision values generated at the decoder; and a list updater which generates a list of candidate coded symbol vectors using the receive vector and provides the list to the MIMO detector at a first iteration, updates the list using the coded symbol vector fed from the hard decision part, and provides the updated list to the MIMO detector at subsequent iterations.

20 Claims, 8 Drawing Sheets

U.S. PATENT DOCUMENTS

| | | |
|---|---|---|
| 7,349,496 B2 * | 3/2008 | Jia et al. .................... 375/341 |
| 2003/0103584 A1 | 6/2003 | Bjerke et al. |
| 2005/0185739 A1 * | 8/2005 | Hansen et al. .............. 375/340 |
| 2007/0116143 A1 * | 5/2007 | Bjerke et al. ............... 375/262 |

FOREIGN PATENT DOCUMENTS

| KR | 1020050065873 | 6/2005 |
|---|---|---|
| KR | 100651036 | 11/2006 |

OTHER PUBLICATIONS

Bertand M. Hochwald et al.; "Achieving Near-Capacity on a Multiple-Antenna Channel"; IEEE Transactions on Communcations; vol. 51; No. 3; Mar. 2003; pp. 389-399.

* cited by examiner

APPARATUS AND METHOD FOR ITERATIVE DETECTION AND DECODING (IDD) IN MULTI-ANTENNA COMMUNICATION SYSTEM

PRIORITY

This application claims priority under 35 U.S.C. §119 to an application filed in the Korean Intellectual Property Office on Dec. 14, 2005 and assigned Serial No. 2005-123024, the contents of which are incorporated herein by reference.

BACKGROUND OF THE INVENTION

1. Field of the Invention

The present invention relates generally to a communication system using a multi-antenna, and in particular, to an apparatus and method of enhancing decoding performance at a receiver using an Iterative Detection and Decoding (IDD) scheme.

2. Description of the Related Art

Recently, with rapid growth of the wireless mobile communication market, various multimedia services in the wireless environment are becoming more heavily demanded. In particular, mass transmission data and rapid data delivery are progressing. Thus, an urgent task is to find a method of efficiently using limited frequencies. To respond to this, a new transmission technique using a multi-antenna is desired. By way of example of the new transmission technique, a Multiple Input Multiple Output (MIMO) system using a multi-antenna is being used.

A MIMO technique, which uses a multi-antenna at a transmitter and a receiver respectively, can increase the channel transmission capacity in proportion to the number of the antennas without additional frequencies or transmit power allocation, compared to a system using a single antenna. Thus, in recent years, active research has been conducted on the MIMO technique.

Multi-antenna techniques are divided largely to a spatial diversity scheme which improves the transmission reliability by acquiring a diversity gain corresponding to the product of the numbers of transmit and receive antennas, a Spatial Multiplexing (SM) scheme which increases the data rate by transmitting a plurality of signal streams at the same time, and a combination scheme of the spatial diversity and the SM schemes.

When adopting the multi-antenna technique, it is known that a Maximum Likelihood (ML) receiver is an optimum scheme to detect a receive signal. However, it is hard to practically realize a ML receiver because complexity increases by raising a length of a codeword to the power of the transmit antennas. Hence, active researches are being conducted on a reception scheme which obtains low complexity and performance close to the ML receiver.

In the mean time, recently, an IDD scheme which applies a turbo principle to a MIMO receiver is attracting great attention. An IDD scheme regards the MIMO part as a coder and models it by concatenating a channel coder with a MIMO coder. In more detail, an IDD scheme is an iterative decoding scheme which inputs the output of a MIMO detector to a channel decoder and feeds back the output of the channel decoder to the MIMO detector. Simply, the MIMO detector generates soft decision information for the receive signal and provides the soft decision information to the channel decoder, and the channel decoder recalculates soft decision values for the respective bits using the input soft decision information as priori information. The soft decision values calculated at the channel decoder are fed back to the MIMO detector and then used as priori information at the MIMO detector. By repeating this process, reliability of the received bits is enhanced.

Representative schemes of a conventional MIMO IDD include List MIMO [B. M. Hochwald and S. ten Brink, "Achieving near-capacity on multiple-antenna channel", IEEE Trans. on Commun, vol. 51, pp. 389-399, March 2003] and turbo-BLAST (Vertical Bell Labs Layered Space-time) [M. Sellathurai and S. Haykin, "TURBO-BLAST for wireless communication: theory and experiments", IEEE Trans. on Signal Processing, vol. 50, pp. 2538-2546, October 2002]. Those two schemes are the same as the IDD scheme, except for the spatial multiplexing at the transmitter and the MIMO signal detection at the receiver. Hereinafter, descriptions are centered on the List MIMO scheme which is known for its good performance.

First, a system model according to the prior art is defined. As shown in FIG. 3, a system of interest similar to the present invention includes $N_T$-ary transmit antennas and $N_R$-ary receive antennas.

A signal vector d consisting of K-ary bits to transmit is transformed to a signal vector c consisting of N-ary coded bits at a channel coder and interleaved at an interleaver having the size N. The interleaved signal vector $\tilde{c}$ is transmitted on the plurality of the antennas via a MIMO transmitter (modulator and demultiplexer). Provided that M-ary coded bits are mapped to a modulation symbol, the number of the coded bits transmitted on the plurality of the antennas at a time is $N_T \times M$. That is, to transmit all of the N-ary coded bits, transmission as many as $N/N_T M$ times are required.

Given the transmit vector at the m-th transmission expressed as $x^{(m)} = [x_1^{(m)} x_2^{(m)} \ldots x_{N_T}^{(m)}]^T$, $m=1,\ldots,N/N_T M$, the receive vector $y^{(m)} = [y_1^{(m)} y_2^{(m)} \ldots y_{N_R}^{(m)}]^T$ received at the receiver is expressed as Equation (1).

$$y^{(m)} = H^{(m)} x^{(m)} + n^{(m)} \tag{1}$$

In Equation (1), $n^{(m)}$ denotes noise vector $N_R \times 1$. $H^{(m)}$ is a $N_T \times N_R$ matrix formed between the transmit and receive antennas at the m-th transmission and can be expressed as Equation (2).

$$H = \begin{bmatrix} h_{11} & h_{12} & \ldots & h_{1N_R} \\ h_{21} & h_{22} & \ldots & h_{2N_R} \\ \vdots & \vdots & \ldots & \vdots \\ h_{N_T 1} & h_{N_T 2} & \ldots & h_{N_T N_R} \end{bmatrix} \tag{2}$$

In Equation (2), the element $h_{ij}$ corresponding to the i-th line and the j-th column denotes a channel response at the i-th transmit antenna with the j-th receive antenna.

A conventional IDD receiver for receiving signals transmitted on the plurality of the antennas is now described.

FIG. 1 shows a conventional IDD receiver in a MIMO antenna system. The conventional IDD receiver includes a list generator 100, a MIMO detector 102, a first subtracter 104, a deinterleaver 106, a Soft-Input Soft-Output (SISO) decoder 108, a second subtracter 110, an interleaver 112, and a hard decision part 114.

The list generator 100 generates a list $\hat{}_1$ of a candidate coded symbol vectors $c = [c_1 c_2 \ldots c_{N_T M}]$ of high reliability using a sphere decoding or a Sorted-Modified ML (S-MML) with respect to the receive vector y. FIG. 2 depicts a list which is generated by selecting four coded symbol vectors in a coded symbol vector space.

The MIMO detector 102 generates a first posterior information vector $L_{D1}$ by MIMO-decoding the receive vector y and the priori information from the interleaver 112. At this time, the MIMO detector 102 performs the decoding using the sphere decoding or the S-MML scheme, and the list of the candidate coded symbol vectors used for the decoding is provided from the list generator 100. At the first iteration, since there is no priori information for each bit, probabilities of being +1 and −1 are initialized to ½, respectively.

The first subtracter 104 produces a first extrinsic information vector $L_{E1}$ by subtracting the first priori information vector $L_{I1}$ of the interleaver 112 from the vector $L_{D1}$ of the MIMO detector 102. The deinterleaver 106 generates a second priori information vector $L_{I2}$ by deinterleaving the first extrinsic information vector $L_{E1}$ from the first subtracter 104.

The SISO decoder 108 generates a second posterior information vector $L_{D2}$ by SISO-decoding the second priori information vector $L_{I2}$ from the deinterleaver 106. The second subtracter 110 generates a second extrinsic information vector $L_{E2}$ by subtracting the second priori information vector $L_{I2}$ of the deinterleaver 106 from the second posterior information vector $L_{D2}$ of the SISO decoder 108. The interleaver 112 generates the first priori information vector $L_{I1}$ by interleaving the second extrinsic information vector $L_{E2}$ from the second subtracter 110.

After repeating the process for a number of times, at the last iteration, the SISO decoder 108 outputs Log-Likelihood Ratios (LLRs) ($L_{D2,information}$) corresponding to the K-ary information bits to the hard decision part 114. Next, the hard decision part 114 generates information bits through the hard decision on the fed LLRs.

In the conventional LIST MIMO scheme of FIG. 1, once calculated, the initial list ^ is fixed and then used the same at all IDD iterations. However, since the LLRs generated at the SISO decoder 108 are more accurate information than the LLRs generated at the MIMO detector 102, it is needed to far more accurately update the list by use of the LLRs generated at the SISO decoder 108. If it is possible to update the list more closely to the receive signal, the overall decoding performance of the IDD receiver will be enhanced.

SUMMARY OF THE INVENTION

An aspect of the present invention is to substantially solve at least the above problems and/or disadvantages and to provide at least the advantages below. Accordingly, an aspect of the present invention is to provide an apparatus and method of continuously updating a candidate list at a LIST MIMO receiver.

Another aspect of the present invention is to provide an apparatus and method of updating a candidate list which is used for MIMO detection by use of extrinsic information generated at an SISO decoder of a LIST MIMO receiver.

A further aspect of the present invention is to provide an apparatus and method of enhancing a decoding performance at an IDD receiver of a LIST MIMO scheme.

The above aspects are achieved by providing an IDD receiving apparatus in a MIMO communication system, the apparatus including an MIMO detector which generates soft decision values of coded bits by MIMO-decoding a receive vector, feedback priori information, and a list of candidate coded symbol vectors; a decoder which SISO-decodes the soft decision values generated at the MIMO detector and feeds back soft decision values of the coded bits to the MIMO detector; a hard decision part which generates a coded symbol vector by performing a hard decision on the soft decision values generated at the decoder; and a list updater which generates a list of candidate coded symbol vectors using the receive vector and provides the list to the MIMO detector at a first iteration, updates the list using the coded symbol vector fed from the hard decision part, and provides the updated list to the MIMO detector at subsequent iterations.

According to another aspect of the present invention, in an IDD receiving method in an MIMO communication system, the method includes generating soft decision values of coded bits by MIMO-detecting with a receive vector, feedback priori information, and a list of candidate coded symbol vectors; SISO-decoding the generated soft decision values and feeding back the soft decision values of the coded bits as an input of the MIMO detection; forming the list using the receive vector at a first iteration; and updating the list using a coded symbol vector obtained by hard-deciding the soft decision values acquired through the SISO decoding.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method of enhancing a decoding performance of an Iterative Detection and Decoding (IDD) receiver in a Multiple Input Multiple Output (MIMO) system.

Figure 8:
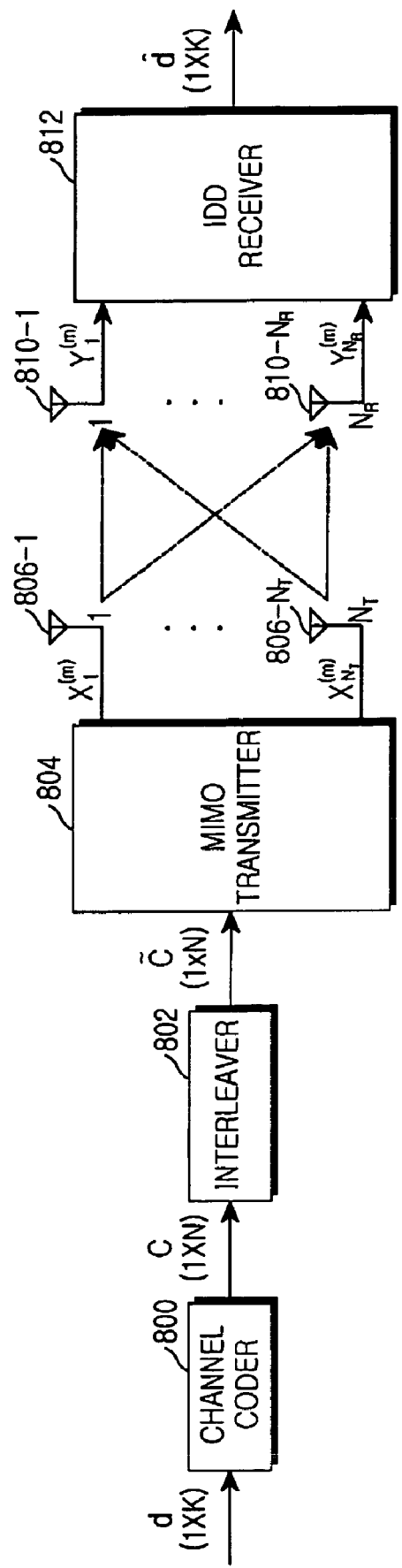
FIG. 8 illustrates a configuration of a transmitter and a receiver in a MIMO system according to the present invention.

FIG. 8 shows a transmitter and a receiver in an MIMO system according to the present invention. The transmitter includes a channel coder 800, an interleaver 802, a MIMO transmitter 804, and a plurality of antennas 806-1 through 806-$N_T$. The receiver includes a plurality of antennas 810-1 through 810-$N_R$ and an IDD receiver 812.

First, in the transmitter, the channel coder 800 outputs coded symbols by coding an information bit stream to transmit at a given coding rate. It is assumed that a vector fed to the channel coder 800 is d and a vector output from the channel coder 800 is c. For instance, the channel coder 800 can be configured using a convolutional encoder, a turbo encoder, a Low Density Parity Check (LDPC) encoder, and so forth.

The interleaver 802 interleaves and outputs the symbols from the channel coder 800 to make them robust against burst error. It is assumed that a vector of size N, which is output from the interleaver 802, is c̃.

The MIMO transmitter 804 generates modulation symbols by modulating the symbols fed from the interleaver 802 in a certain modulation scheme, demultiplexes the modulation symbols, and transmits them on the plurality of the antennas 806-1 through 806-$N_T$. For instance, the modulation scheme includes Binary Phase Shift Keying (BPSK) which maps one bit (s=1) to one complex signal, Quadrature Phase Shift Keying (QPSK) which maps two bits (s=2) to one complex signal, 8-ary Quadrature Amplitude Modulation (8QAM) which maps three bits (s=3) to one complex signal, and 16QAM which maps four bits (s=4) to one complex signal.

Although not shown in the drawing, when adopting an Orthogonal Frequency Division Multiplexing (OFDM) communication scheme, the streams output from the MIMO transmitter 804 are OFDM-modulated respectively. The OFDM-modulated signals are Radio Frequency (RF)-processed to fit for the over-the-air transmission and then transmitted via the corresponding antennas over the air. As such, the Spatial Multiplexing (SM) transmitter can have various modifications. The IDD scheme according to the present invention can be applied to a case where a demultiplexer (DEMUX) is placed at a front portion of the channel decoder to independently perform the channel coding and the interleaving and a case where the OFDM is adopted. When using the OFDM scheme, the basic structure and operation are the same but the difference lies in that Equation (1) is the representation in the frequency domain and that m denotes the transmission time together with the subcarrier index, rather than merely the transmission time.

Next, in the receiver, the plurality of the antennas 810-1 through 810-$N_R$ receive the signals from the plurality of the antennas 806-1 through 806-$N_T$. Although not shown in the drawing, the RF signals received on the plurality of the antennas 810-1 through 810-$N_R$ are converted to baseband sample data, respectively, and the sample data are OFDM-demodulated and then fed to the IDD receiver 812.

The IDD receiver 812 outputs an estimation vector d̂ (1×K) by decoding the fed receive vector y in accordance with the IDD scheme. In doing so, according to the present invention, the IDD receiver 812 features of the enhanced decoding performance with the small number of iterations by updating or recalculating the candidate list used for the MIMO detection at every iteration. The IDD receiver 812 of the present invention will be further explained in reference to FIG. 4.

Figure 1:
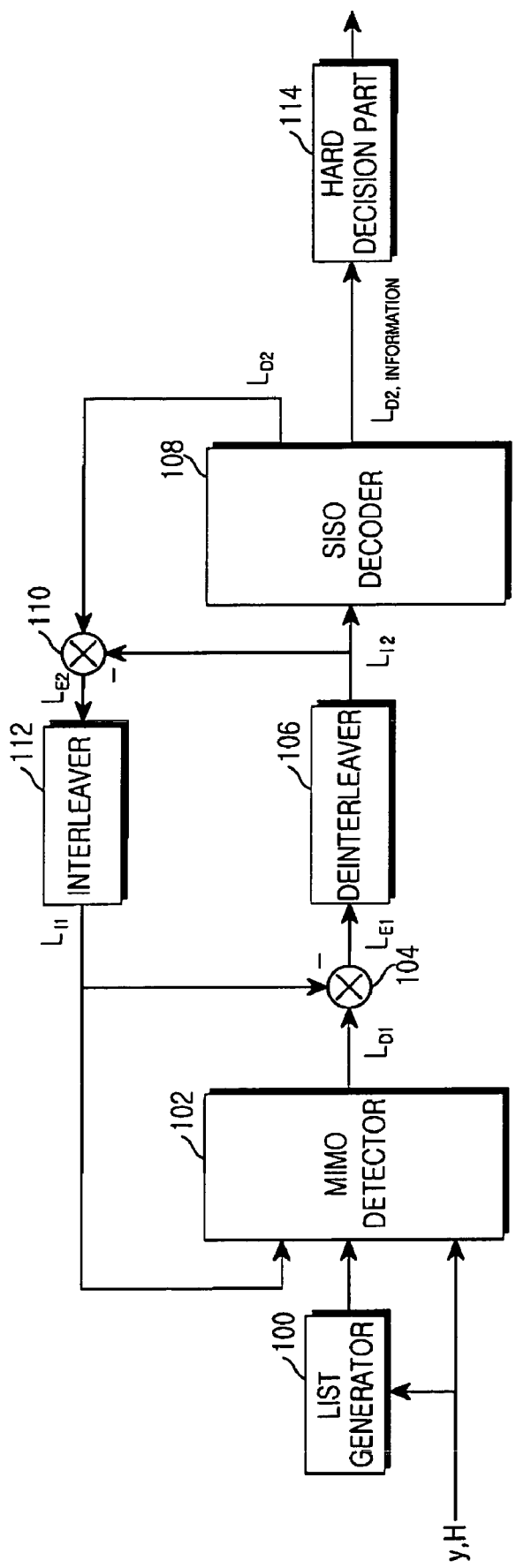
FIG. 1 illustrates a configuration of a conventional IDD receiver in a MIMO system.
Figure 2:
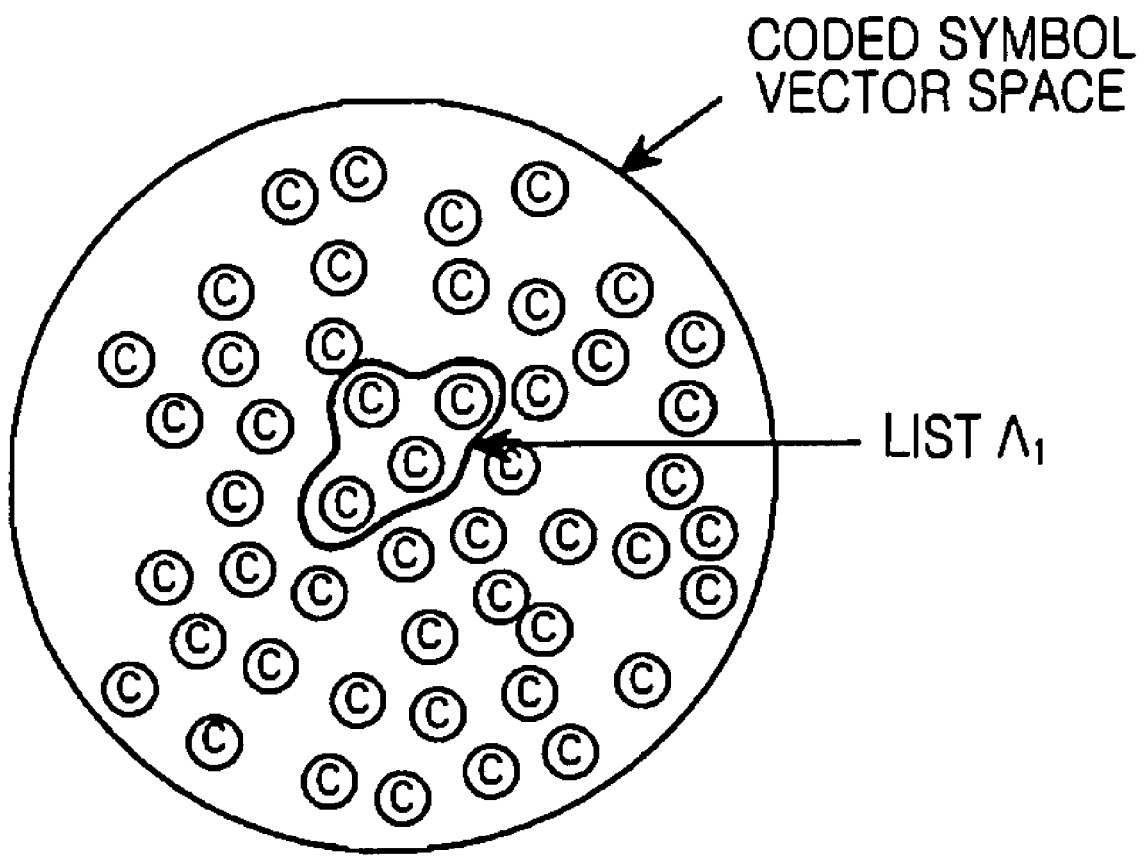
FIG. 2 illustrates a list which is formed by selecting four coded symbol vectors in a coded symbol vector space according to the prior art.
Figure 3:
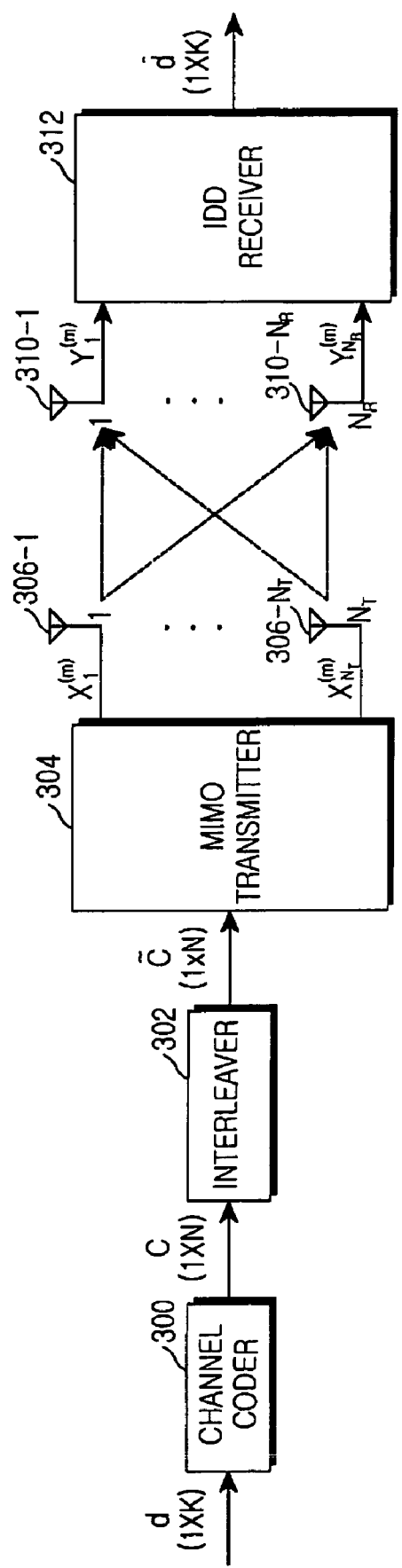
FIG. 3 illustrates a configuration of a transmitter and a receiver in an MIMO system according to the prior art.
Figure 4:
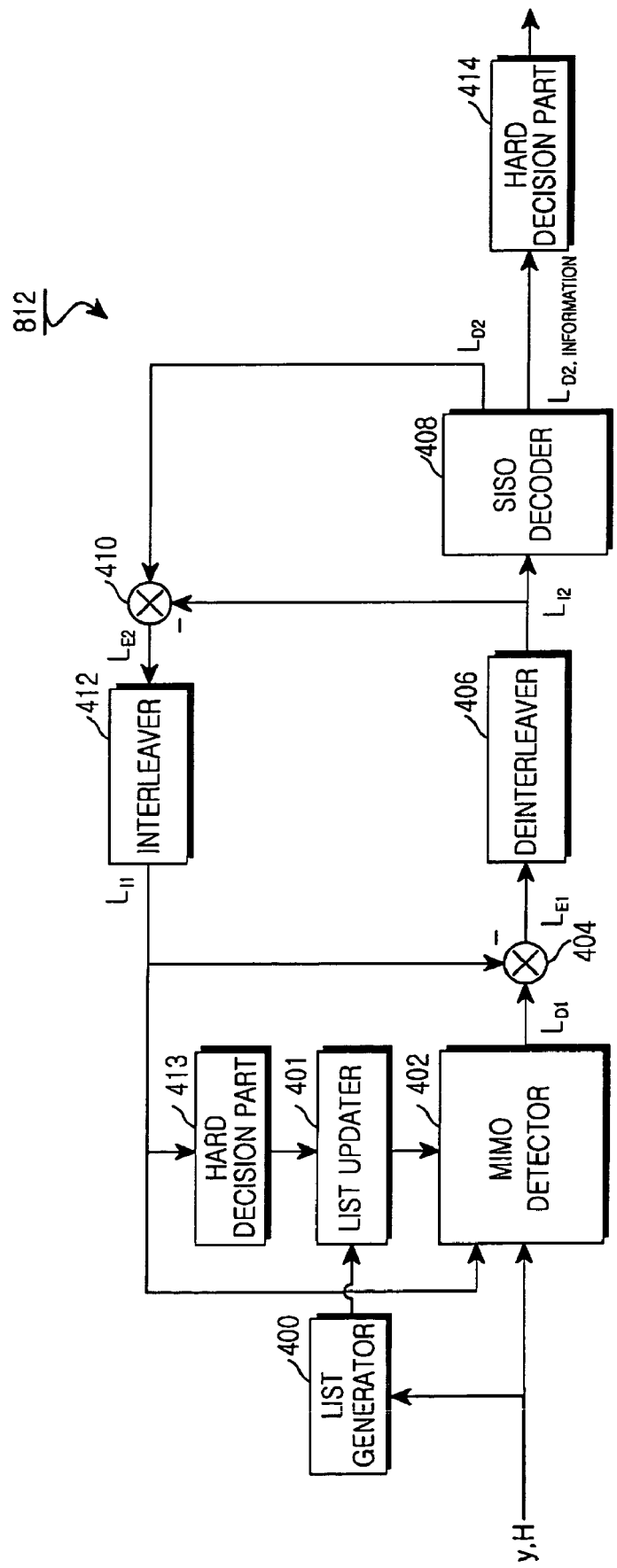
FIG. 4 illustrates a detailed configuration of the IDD receiver of FIG. 3.

FIG. 4 shows the IDD receiver 812 of FIG. 3 according to the present invention. The IDD receiver 812 includes a list generator 400, a list updater 401, an MIMO detector 402, a first subtracter 404, a deinterleaver 406, an SISO decoder 408, a second subtracter 410, an interleaver 412, a first hard decision part 413, and a second hard decision part 414.

Referring to FIG. 4, the list generator 400 generates a list $\hat{}_1$ of candidate coded symbol vectors c=[$c_1 c_2 \ldots c_{N_T M}$] of high reliability using the sphere decoding or the Sorted-Modified Maximum Likelihood (S-MML) with respect to the receive vector y. The size of the list is set to a proper value by taking account of the trade-off between complexity and performance.

The list updater 401 receives the initial candidate list from the list generator 400, updates the candidate list according to information from the first hard decision part 413, and provides the updated candidate list to the MIMO detector 402.

The MIMO detector 402 generates a first posterior information vector $L_{D1}$ by MIMO-decoding the receive vector y and priori information from the interleaver 412. The MIMO detector 402 performs the decoding using the sphere decoding or the S-MML scheme. The list of the candidate coded symbol vectors used for the decoding is provided from the list updater 401. Since there is no priori information for each bit at the first iteration, probabilities of being +1 and −1 are initialized to ½ respectively.

The first posterior information, which is the output from the MIMO detector 402, is defined as a Log-Likelihood Ratio (LLR) value as in Equation (3).

$$L_{D1}(c_k \mid y) = \ln \frac{P[c_k = +1 \mid y]}{P[c_k = -1 \mid y]} \quad (3)$$

In Equation (3), $c_k$ denotes a k-th bit and $P[c_k=+1|y]$ denotes the probability of the k-th bit being '+1' when receiving the vector y.

Equation (3) can be expressed as summation of intrinsic information and extrinsic information as in Equation (4).

$$\begin{aligned} L_{D1}(c_k \mid y) &= \ln \frac{P[c_k = +1 \mid y]}{P[c_k = -1 \mid y]} \\ &= \ln \frac{P[c_k = +1]}{P[c_k = -1]} + \ln \frac{P[y \mid c_k = +1]}{P[y \mid c_k = -1]} \\ &= L_{I1}(c_k) + L_{E1}(c_k \mid y) \end{aligned} \quad (4)$$

In Equation (4), $$\ln \frac{P[y \mid c_k = +1]}{P[y \mid c_k = -1]}$$

is determined depending on the adopted detection scheme. Given the generated list as $\hat{}$, $$\ln \frac{P[y \mid c_k = +1]}{P[y \mid c_k = -1]}$$

is calculated based on Equation (5).

$$\ln \frac{P[y \mid c_k = +1]}{P[y \mid c_k = -1]} = \ln \frac{\sum_{c \in \hat{}_{k,+1}} p(y \mid c) \cdot \exp\left(\frac{1}{2} c_{[k]}^T L_{I1,[k]}\right)}{\sum_{c \in \hat{}_{k,-1}} p(y \mid c) \cdot \exp\left(\frac{1}{2} c_{[k]}^T L_{I1,[k]}\right)} \quad (5)$$

In Equation (5), $\hat{}_{k,\pm 1}$ denotes the list having the k-th bit being +1 or −1. $C_{[k]}$ denote a vector excluding the k-th bit from the vector c and $L_{I1,[k]}$ denotes a vector excluding the k-th bit from the LLR vector fed from the MIMO detector 402.

The first subtracter 404 outputs a first extrinsic information vector $L_{E1}$ by subtracting the first priori information vector $L_{I1}$ of the interleaver 412 from the vector $L_{D1}$ of the MIMO detector 402. The deinterleaver 406 generates a second priori information vector $L_{I2}$ to be used at the SISO decoder 408 by deinterleaving the first extrinsic information vector $L_{E1}$ from the first subtracter 404.

The SISO decoder 408 generates a second posterior information vector $L_{D2}$ by SISO-decoding the second priori information vector $L_{I2}$ from the deinterleaver 408. The SISO decoder 408 calculates and outputs the second posterior information vector $L_{D2}$ in the similar manner as in Equation (4) and Equation (5). For instance, the SISO decoder 408 carries out the decoding using Bahl-Cocke-Jelinke-Raviv (BCJR) Maximum a Posteriori (MAP) decoding, a SISO Viterbi process, and so forth.

The second subtracter 410 generates a second extrinsic information vector $L_{E2}$ by subtracting the second priori information vector $L_{I2}$ of the deinterleaver 406 from the second posterior information vector $L_{D2}$ of the SISO decoder 408. The interleaver 412 generates the first priori information vector $L_{I1}$ by interleaving the second extrinsic information vector $L_{E2}$ of the second subtracter 410. The first priori information vector $L_{I1}$ is provided to the first hard decision part 413 and the MIMO detector 402.

The first hard decision part 413 makes hard decision on the first priori information vector $L_{I1}$ of the interleaver 412 and provides the coded symbol vector to the list updater 401. Next, the list updater 401 forms a new list using the coded symbol vector from the first hard decision part 413, or updates and provides the list $\hat{}_1$ to the MIMO detector 402. In more detail, the list updater 401 provides the list of the list generator 400 to the MIMO detector 402 at the first iteration, and provides the updated list to the MIMO detector 402 afterwards. The operation of the list updater 401 will be explained in detail by referring to FIG. 6.

After repeating this process over a number of times, at the last iteration, the SISO decoder 408 outputs LLRs ($L_{D2,information}$) corresponding to the K-ary information bits to the second hard decision part 414. Next, the second hard decision part 414 makes hard decision on the input LLRs and produces the information bits transmitted from the transmitter.

Figure 5:
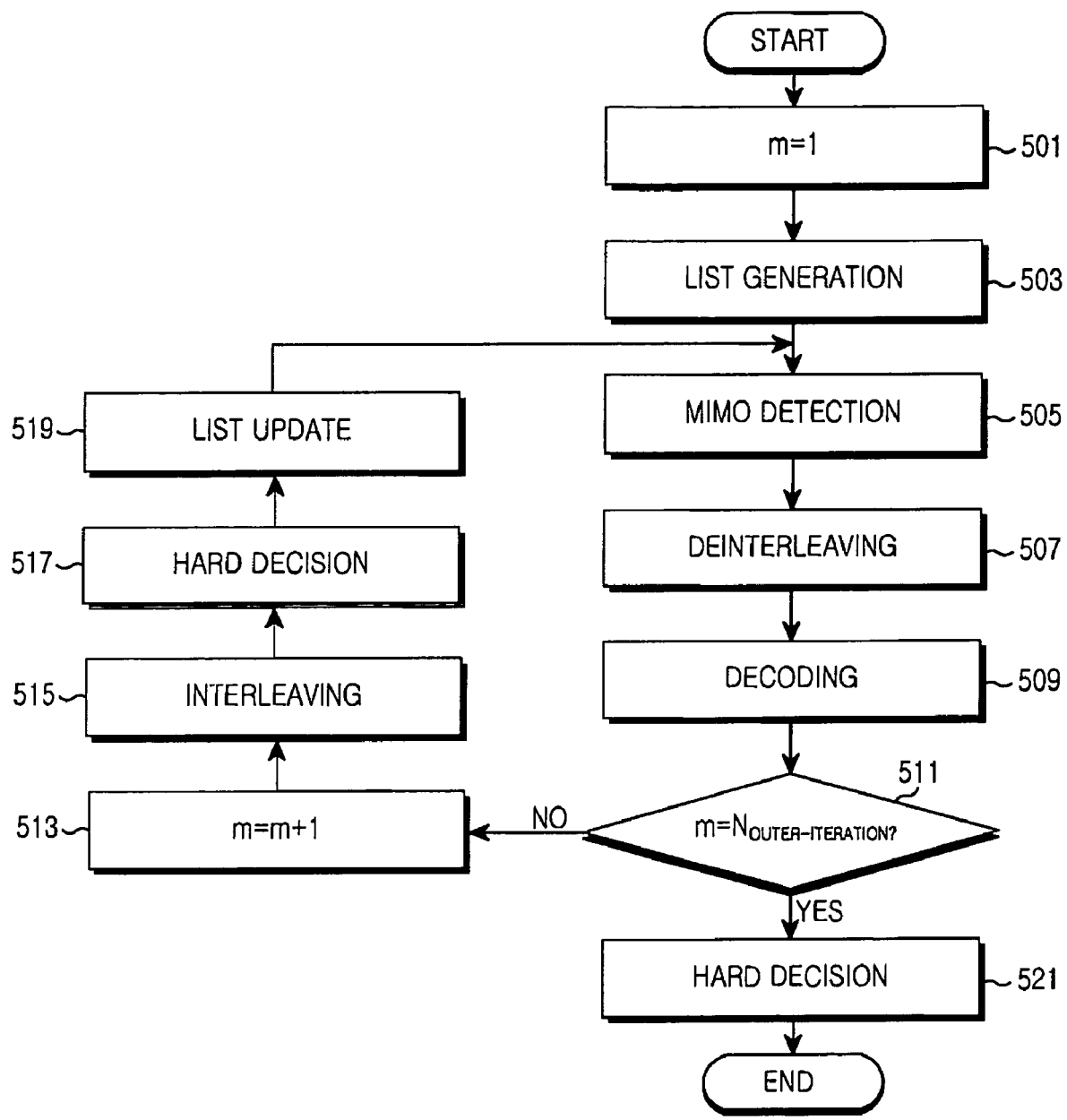
FIG. 5 is a flowchart outlining an operation of the receiver in the MIMO communication system according to the present invention.

FIG. 5 shows an operation of the receiver in the MIMO communication system according to the present invention. The receiver initializes m, which denotes the iterative decoding times (or iteration times), to '1' in step 501. In step 503, the receiver generates the list $\hat{}_1$ of the candidate coded symbol vectors of high reliability using the sphere decoding or the S-MML with respect to the receive vector y.

Next, the receiver generates the first posterior information by MIMO decoding the receive vector y, the priori information fed back, and the list of the candidate coded symbol vectors in step 505. The MIMO decoding scheme can employ the sphere decoding, the S-MML scheme, and so forth. The candidate list used for the decoding is generated in step 503 or 519. Specifically, the candidate list generated in step 503 is used at the first iteration, and the candidate list generated in step 519 is used afterwards. Since there is no priori information fed back at the first iteration, the probabilities of being +1 and -1 are initialized to ½ respectively.

After the MIMO decoding process, the receiver deinterleaves the first posterior information in step 507 and generates the second posterior information by SISO-decoding the deinterleaved LLRs in step 509.

In step 511, the receiver checks whether m denoting the iteration times reaches a certain value ($N_{outer-iteration}$). When m is not equal to the certain value, the receiver increases the iteration times m by one in step 513.

Next, the receiver interleaves the second posterior information in step 515 and generates the coded symbol vector by making hard decision on the interleaved LLRs in step 517.

The receiver newly forms a candidate list using the generated coded symbol vector or updates the list $\hat{}_1$ in step 519, and then returns to step 515 to perform the subsequent steps. By contrast, from the second iteration, the receiver executes the MIMO decoding using the LLRs, which are interleaved in step 515, as the priori information. The list updating process in step 519 will be further described by referring to FIG. 6.

By contrast, when the m reaches the certain number of times in step 511, the receiver acquires the information bit streams transmitted from the transmitter by making the hard decision on the SISO decoding result in step 521 and then terminates the process of the present invention.

Figure 6A:
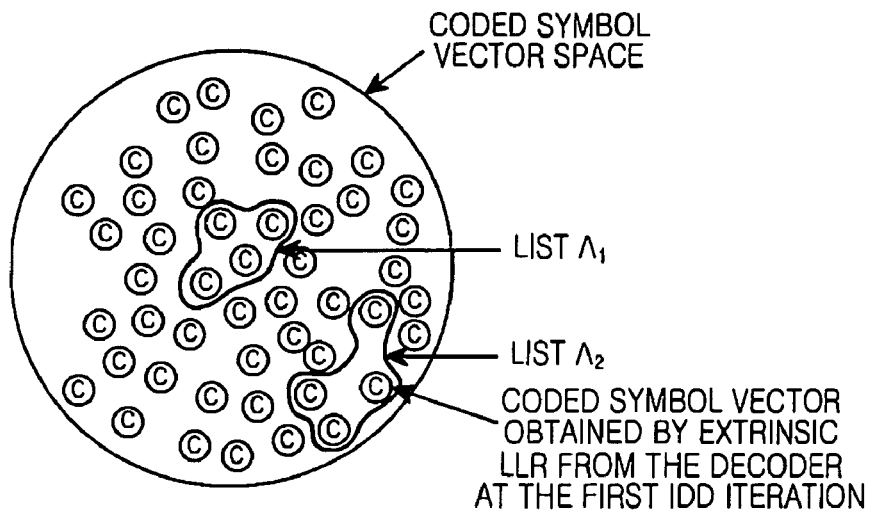
FIGS. 6A to 6C illustrate list updating methods suggested by the present invention.
Figure 6B:
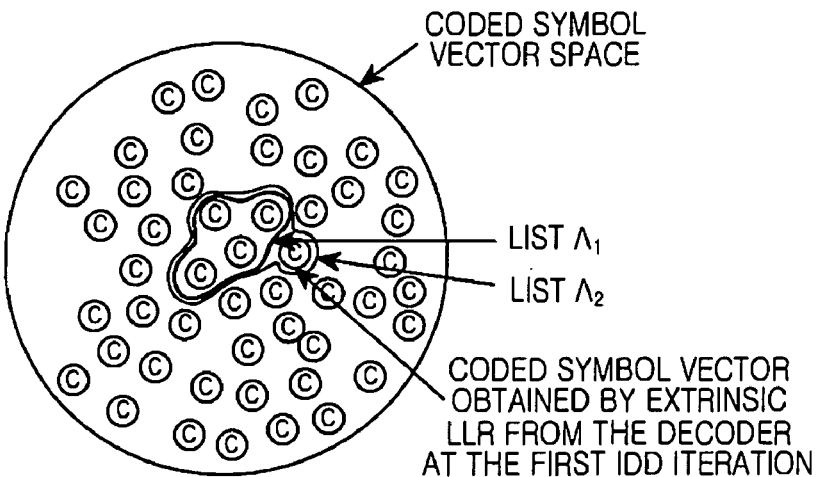
Figure 6C:
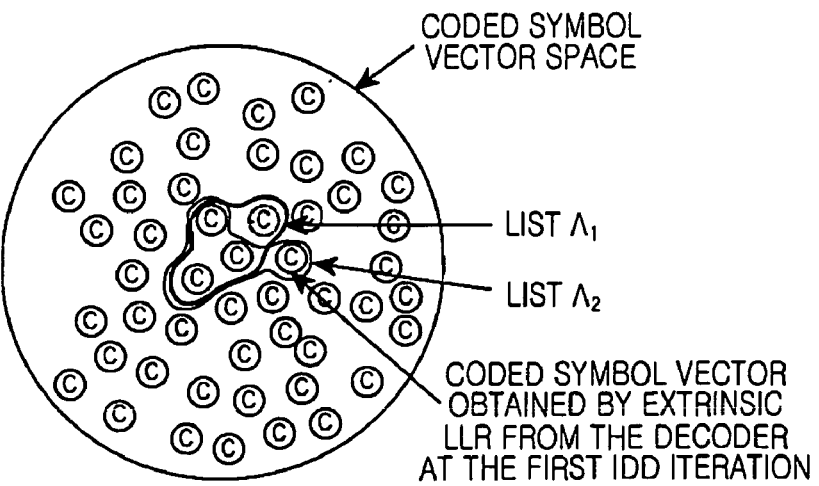

FIGS. 6A to 6C shows list updating methods according to the present invention. The circle indicates the coded symbol vector space and has the size of $2^{N_T M}$. $N_T$ denotes the number of antennas of the transmitter and M denotes a modulation order. That is, each point c denotes the coded symbol vector. The list $\hat{}_1$, which is the candidate list used at the first iteration, is the list to be updated at every subsequent iteration. The list $\hat{}_2$ is the candidate list used at the second iteration. The following methods are by way of example, and the list can be updated using other various methods.

As for the first method by referring first to FIG. 6A, the list $\hat{}_1$ is formed using the receive vector at the iteration 1. At the iteration 2, a new list $\hat{}_2$ is formed by sphere-decoding the coded symbol vector obtained through the hard decision on the extrinsic LLRs generated at the decoder 408.

As for the second method by referring to FIG. 6B, the list $\hat{}_1$ is formed using the receive vector at the iteration 1. At the iteration 2, the list $\hat{}_2$ is constituted by adding the coded symbol vector obtained from the hard-decided extrinsic LLRs generated at the decoder 408 to the existing list $\hat{}_1$.

As for the third method by referring to FIG. 6C, the list $\hat{}_1$ is constituted using the receive vector at the iteration 1. At the iteration 2, a candidate coded symbol vector having the minimum reliability is removed from the existing list $\hat{}_1$ and the list $\hat{}_2$ is formed by adding the coded symbol vector obtained from the soft-decided extrinsic LLRs generated at the decoder 408.

Figure 7:
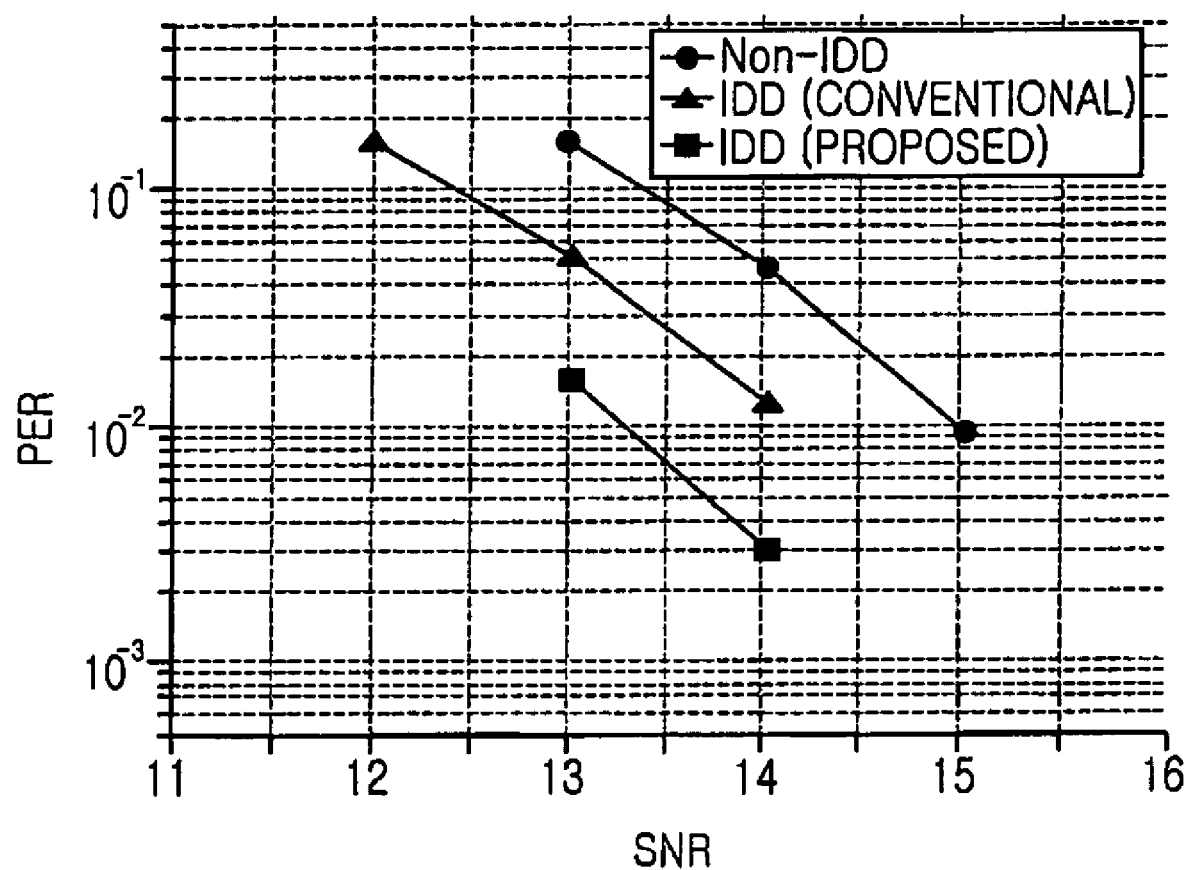
FIG. 7 is a simulation graph for proving the performance of the present invention.

FIG. 7 shows a simulation graph for proving the performance of the present invention. The horizontal axis indicates the Signal to Noise Ratio (SNR) and the vertical axis indicates the Packet Error Rate (PER). 4×4 MIMO-OFDM system is given and the Fast Fourier Transform (FFT) size is set to 4096. The modulation scheme is the 16QAM, the MIMO detection scheme is the S-MML, and the channel code is ⅚ rate LDPC code, and the packet size is acquired from the simulation in the 9-tap exponential decay channel using 12608 bits/packet.

As shown in FIG. 7, at the PER 0.01, the conventional IDD has the gain of 0.8 dB compared to the non-IDD. Notably, the IDD of the present invention acquires the additional gain of 0.8 dB compared to the conventional IDD.

In light of the foregoing, when using the IDD scheme in the MIMO communication system, the decoding performance can be enhanced with the small number of iterations by updating the list using the extrinsic information provided from the decoder to the MIMO detector.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An Iterative Detection and Decoding (IDD) receiving apparatus in a Multiple Input Multiple Output (MIMO) communication system, the apparatus comprising:

a MIMO detector which generates soft decision values of coded bits by MIMO-decoding a receive vector, feedback priori information, and a list of candidate coded symbol vectors;

a decoder which Soft-Input/Soft-Output (SISO)-decodes values derived from the soft decision values generated at the MIMO detector and feeds back soft decision values of the coded bits to generate an input for the MIMO detector;

a hard decision part which generates a coded symbol vector by performing a hard decision on the soft decision values generated at the decoder; and a list updater which generates a list of candidate coded symbol vectors using the receive vector and provides the list to the MIMO detector at a first iteration, updates the list using the coded symbol vector fed from the hard decision part, and provides the updated list to the MIMO detector at subsequent iterations.

2. The IDD receiving apparatus of claim 1, further comprising:

a deinterleaver which deinterleaves the soft decision values from the MIMO detector and provides the deinterleaved values to the decoder; and an interleaver which interleaves the soft decision values from the decoder and provides the interleaved values to the MIMO detector.

3. The IDD receiving apparatus of claim 2, further comprising:

a first subtracter which subtracts the soft decision values of the interleaver from the soft decision values of the MIMO detector and provides a result to the deinterleaver; and a second subtracter which subtracts the soft decision values of the decoder from the soft decision values of the deinterleaver and provides a result to the interleaver.

4. The IDD receiving apparatus of claim 1, wherein the list updater forms an initial list using one of a sphere decoding and a Sorted-Modified Maximum Likelihood (S-MML).

5. The IDD receiving apparatus of claim 1, wherein the list updater updates the list by sphere-decoding the coded symbol vector from the hard decision part at every iteration.

6. The IDD receiving apparatus of claim 1, wherein the list updater updates the list by adding the coded symbol vector of the hard decision part to a previous list at every iteration.

7. The IDD receiving apparatus of claim 1, wherein the list updater removes a coded symbol vector of lowest reliability from a previous list and updates the list by adding the coded symbol vector of the hard decision part at every iteration.

8. The IDD receiving apparatus of claim 1, wherein the MIMO detector performs the decoding using one of a sphere decoding and a Sorted-Modified Maximum Likelihood (S-MML).

9. The IDD receiving apparatus of claim 1, wherein the decoder performs the decoding using one of a Bahl-Cocke-Jelinke-Raviv (BCJR) Maximum A Posteriori (MAP) process and an SISO Viterbi process.

10. The IDD receiving apparatus of claim 1, wherein the soft decision value output from the MIMO detector and the decoder is a Log-Likelihood Ratio (LLR) value.

11. An Iterative Detection and Decoding (IDD) receiving method in a Multiple Input Multiple Output (MIMO) communication system, the method comprising:

generating soft decision values of coded bits by MIMO-detecting with a receive vector, feedback priori information, and a list of candidate coded symbol vectors;

Soft-Input/Soft-Output (SISO)-decoding values derived from the generated soft decision values and feeding back the soft decision values of the coded bits for generation of an input of the MIMO detection;

forming the list using the receive vector at a first iteration; and updating the list using a coded symbol vector obtained by hard-deciding the soft decision values acquired through the SISO decoding.

12. The IDD receiving method of claim 11, further comprising:

acquiring an information bit stream transmitted from a transmitter by hard-deciding a result of the SISO decoding when a number of iterations reaches a certain value.

13. The IDD receiving method of claim 11, further comprising:

deinterleaving the soft decision values acquired through the MIMO detection and providing the deinterleaved values as an input of the SISO decoding; and interleaving the soft decision values acquired through the SISO decoding and providing the interleaved values as an input of the MIMO detection.

14. The IDD receiving method of claim 11, the list of the candidate coded symbol vectors is generated using a sphere decoding or a Sorted-Modified Maximum Likelihood (S-MML).

15. The IDD receiving method of claim 11, wherein the list is updated by performing the sphere decoding with a coded symbol vector obtained from hard decision of the soft decision values acquired through the SISO decoding at every iteration.

16. The IDD receiving method of claim 11, wherein the list is updated by adding a coded symbol vector obtained from hard decision of the soft decision values acquired through the SISO decoding, to a previous list at every iteration.

17. The IDD receiving method of claim 11, wherein the list is updated by removing a coded symbol vector of lowest reliability from a previous list and adding a coded symbol vector obtained from hard decision of the soft decision values acquired through the SISO decoding at every iteration.

18. The IDD receiving method of claim 11, wherein the MIMO detection is one of a sphere-decoding and a Sorted-Modified Maximum Likelihood (S-MML) decoding.

19. The IDD receiving method of claim 11, wherein the SISO decoding is one of a Bahl-Cocke-Jelinke-Raviv (BCJR) Maximum A Posteriori (MAP) decoding and an SISO Viterbi decoding.

20. The LDD receiving method of claim 11, wherein the soft decision value acquired through the MIMO detection and the SISO decoding is a Log-Likelihood Ratio (LLR) value.

* * * * *